US010089556B1

(12) United States Patent
Xu

(10) Patent No.: US 10,089,556 B1
(45) Date of Patent: Oct. 2, 2018

(54) SELF-ATTENTION DEEP NEURAL NETWORK FOR ACTION RECOGNITION IN SURVEILLANCE VIDEOS

(71) Applicant: KONICA MINOLTA LABORATORY U.S.A., INC., San Mateo, CA (US)

(72) Inventor: Ting Xu, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/620,492

(22) Filed: Jun. 12, 2017

(51) Int. Cl.
G06K 9/00 (2006.01)
G06K 9/62 (2006.01)
G06N 3/08 (2006.01)
G06N 5/04 (2006.01)

(52) U.S. Cl.
CPC ......... *G06K 9/627* (2013.01); *G06K 9/00771* (2013.01); *G06N 3/08* (2013.01); *G06N 5/04* (2013.01)

(58) Field of Classification Search
USPC ................................................ 382/155–161
See application file for complete search history.

(56) References Cited

U.S. PATENT DOCUMENTS

| | | | |
|---|---|---|---|
| 7,711,174 B2 * | 5/2010 | Sammak | G06K 9/00127 382/133 |
| 8,345,984 B2 | 1/2013 | Ji et al. | |
| 9,230,159 B1 | 1/2016 | Vijayanarasimhan et al. | |
| 2010/0034462 A1 | 2/2010 | Nevatia et al. | |
| 2011/0182469 A1 | 7/2011 | Ji et al. | |
| 2015/0023590 A1 | 1/2015 | Fahn et al. | |
| 2016/0350336 A1 * | 12/2016 | Checka | G06F 17/30268 |
| 2016/0358038 A1 * | 12/2016 | Jaderberg | G06K 9/03 |
| 2017/0124711 A1 * | 5/2017 | Chandraker | G06K 9/00201 |
| 2017/0228633 A1 * | 8/2017 | Danihelka | G06K 9/6257 |
| 2018/0144248 A1 * | 5/2018 | Lu | G06F 17/241 |

FOREIGN PATENT DOCUMENTS

WO 2016197046 A1 12/2016

OTHER PUBLICATIONS

Sonderby, Recurrent Spatial Transformer Networks, Sep. 17, 2015.*
Jaderberg et al., "Spatial Transformer Networks", arXiv preprint, arXiv:1506.02025v3, Feb. 4, 2016.

* cited by examiner

*Primary Examiner* — Alex Liew
(74) *Attorney, Agent, or Firm* — Chen Yoshimura LLP

(57) ABSTRACT

An artificial neural network for analyzing input data, the input data being a 3D tensor having D channels, such as D frames of a video snippet, to recognize an action therein, including: D spatial transformer modules, each generating first and second spatial transformations and corresponding first and second attention windows using only one of the D channels, and transforming first and second regions of each of the D channels corresponding to the first and second attention windows to generate first and second patch sequences; first and second CNNs, respectively processing a concatenation of the D first patch sequences and a concatenation of the D second patch sequences; and a classification network receiving a concatenation of the outputs of the first and second CNNs and the D sets of transformation parameters of the first transformation outputted by the D spatial transformer modules, to generate a predicted action class.

8 Claims, 3 Drawing Sheets

SELF-ATTENTION DEEP NEURAL NETWORK FOR ACTION RECOGNITION IN SURVEILLANCE VIDEOS

BACKGROUND OF THE INVENTION

Field of the Invention

This invention relates to video image analysis, and in particular, it relates to action recognition in surveillance videos using a self-attention deep neural network.

Description of Related Art

In analyzing surveillance videos, action recognition is an important goal, which requires recognizing the action of main subjects in a video. For example, one application of action recognition is in real-time surveillance monitoring employed in healthcare or elder care facilities, where video camera are installed in a room, e.g. at the ceiling, to monitor falls of the patient or other dangerous situations in order to alarm the care provider. Automatic action recognition from healthcare surveillance videos greatly improves the care quality and reduces personnel costs. However, automatic action recognition by machines presents a challenge for conventional technologies.

Many artificial neural network models and other algorithms have been described with the goal of achieving automatic human action recognition. For example, U.S. Pat. No. 8,345,984 (also published as U.S. Pat. Appl. Pub. No. 20110182469), entitled "3D convolutional neural networks for automatic human action recognition," describes a system and method "to recognize human action from one or more video frames by performing 3D convolutions to capture motion information encoded in multiple adjacent frames and extracting features from spatial and temporal dimensions therefrom; generating multiple channels of information from the video frames, combining information from all channels to obtain a feature representation for a 3D CNN model; and applying the 3D CNN model to recognize human actions." (Abstract.)

U.S. Pat. No. 9,230,159, entitled "Action recognition and detection on videos," describes a system and method "that facilitate employing exemplar Histogram of Oriented Gradients Linear Discriminant Analysis (HOG-LDA) models along with Localizer Hidden Markov Models (HMM) to train a classification model to classify actions in videos by learning poses and transitions between the poses associated with the actions in a view of a continuous state represented by bounding boxes corresponding to where the action is located in frames of the video." (Abstract.)

U.S. Pat. Appl. Pub. No. 20150023590, entitled "Method and system for human action recognition," describes a method that classifies an action based on the ranking of similarity of gesture in a nearest neighbor fashion.

U.S. Pat. Appl. Pub. No. 20100034462, entitled "Automated Single Viewpoint Human Action Recognition by Matching Linked Sequences of Key Poses," describes a method that compares the observed action with some reference key poses to determine its action type. This method does not use machine learning methods to train a model.

A paper entitled "Spatial Transformer Networks", by M. Jaderberg, K. Simonyan, A. Zisserman and K. Kavukcuoglu, arXiv preprint arXiv:1506.02025v3, 4 Feb. 2016 (hereinafter "Jaderberg et al. 2016"), describes a spatial transformer module and neural networks containing the spatial transformer module. WIPO publication No. WO 2016197046 A1, entitled "Spatial transformer modules," also describes this spatial transformer.

SUMMARY

The present invention is directed to a neural network architecture and related method and apparatus for action recognition.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides an artificial neural network implemented on a data processing system for analyzing input data to recognize an action therein, the input data being a 3-dimensional input tensor having D channels, D being a natural number greater than 1, the artificial neural network including: D spatial transformer neural network modules, wherein each spatial transformer module is configured to receive the input tensor, generate a first and a second spatial transformation using only one of the D channels, generate a first and a second attention window respectively corresponding to the first and the second spatial transformation, transform a first and a second region of each of the D channels of the input tensor corresponding to the first and the second attention window to a first and a second output patch for that channel, the first and the second output patches for all D channels respectively forming a first and a second patch sequence, wherein each spatial transformer module is further configured to output a set of first transformation parameters of the first spatial transformation, wherein different ones of the D spatial transformer modules are configured to use different ones of the D channels of the input tensor to generate their first and second spatial transformations; a first and a second convolutional neural network (CNN), the first CNN being configured to receive as input a concatenation of the D first patch sequences generated by the D spatial transformer modules and to generate a first CNN output, the second CNN being configured to receive as input a concatenation of the D second patch sequences generated by the D spatial transformer modules and to generate a second CNN output; and a classification neural network, configured to receive as input a concatenation of the first CNN output, the second CNN output, and the D sets of first transformation parameters outputted by the D spatial transformer modules, and to generate a predicted action class.

In one embodiment, each spatial transformer neural network module includes: a localization neural network, configured to receive the one of the D channels of the input tensor and to generate the set of first transformation parameters and a set of second transformation parameters; a first grid generator, configured to generate a first sampling grid by transforming a first regular grid according to the set of first transformation parameters into the first sampling grid over the one channel of the input tensor; a second grid generator, configured to generate a second sampling grid by transforming a second regular grid according to the set of second transformation parameters into the second sampling grid over the one channel of the input tensor; and a sampler, configured to apply the first sampling grid to sample each one of the D channels of the input tensor to generate the first patch sequence, and to apply the second sampling grid to sample each one of the D channels of the input tensor to generate the second patch sequence.

In another aspect, the present invention provides a method performed by an artificial neural network implemented on a data processing system, to analyze input data to recognize an action therein, the input data being a 3-dimensional input tensor having D channels, D being a natural number greater than 1, the artificial neural network comprising D spatial transformer neural network modules, a first and a second convolutional neural network (CNN), and a classification neural network, the method including: by each of the D spatial transformer neural network modules: receiving the input tensor; using only one of the D channels of the input tensor, generating a set of first transformation parameters and a set of second transformation parameters; generating a first sampling grid by transforming a first regular grid according to the set of first transformation parameters into the first sampling grid over the one channel of the input tensor; generating a second sampling grid by transforming a second regular grid according to the set of second transformation parameters into the second sampling grid over the one channel of the input tensor; applying the first sampling grid to sample each one of the D channels of the input tensor to generate a first patch sequence; and applying the second sampling grid to sample each one of the D channels of the input tensor to generate a second patch sequence; wherein different ones of the D spatial transformer modules use different ones of the D channels of the input tensor to generate their first and second spatial transformations; concatenating the D first patch sequences generated by the D spatial transformer modules into first concatenated data; by the first CNN, receiving the first concatenated data as input and generating a first CNN output; concatenating the D second patch sequences generated by the D spatial transformer modules into second concatenated data; by the second CNN, receiving the second concatenated data as input and generating a second CNN output; concatenating the first CNN output, the second CNN output, and the D sets of first transformation parameters generated by the D spatial transformer modules into a final feature vector; and by the classification neural network, receiving the final feature vector as input and generating a predicted action class.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
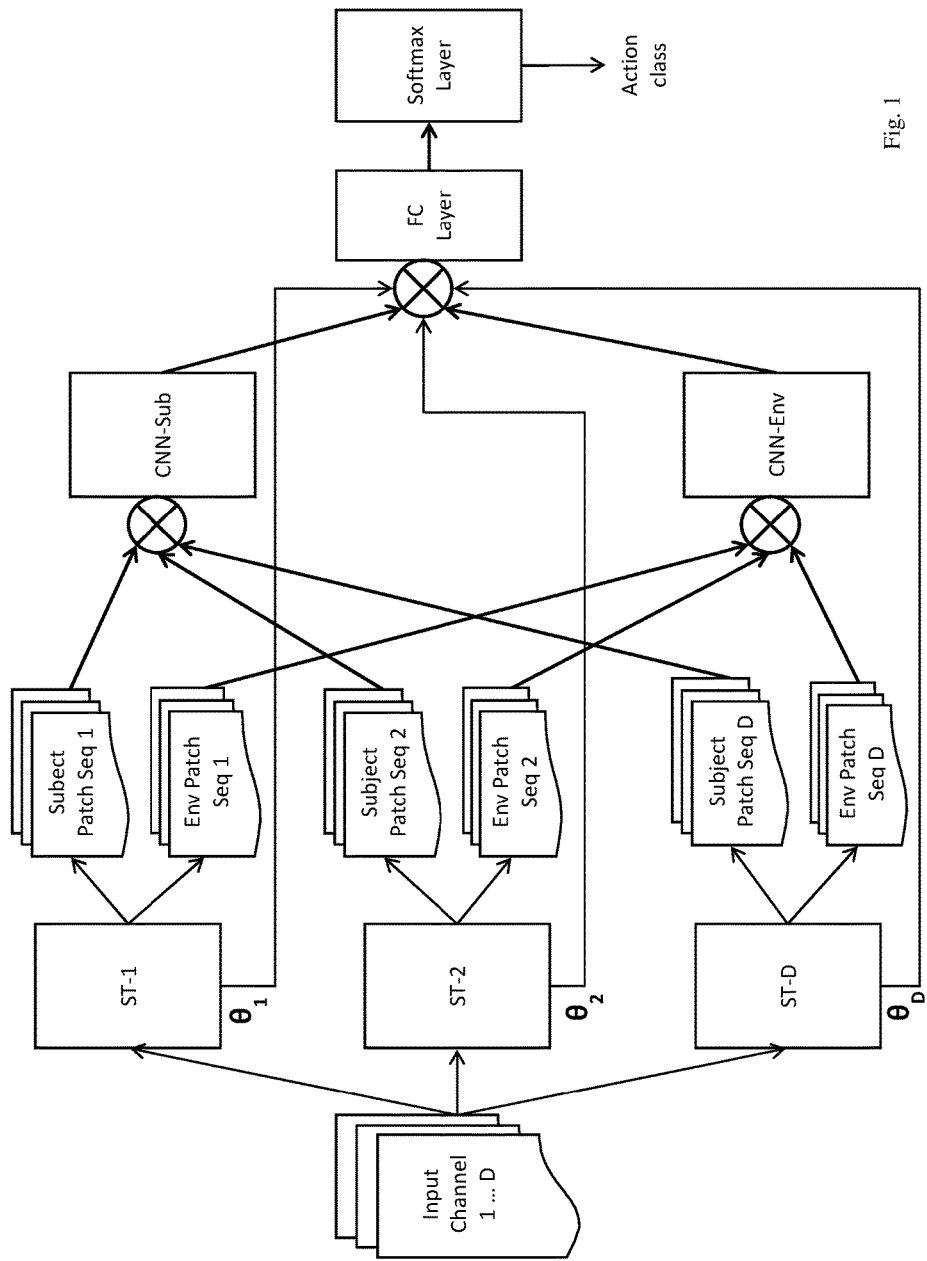
FIG. 1 schematically illustrates the architecture of a ST-CNN neural network according to an embodiment of the present invention.

Embodiments of the present invention extend deep convolutional neural networks (CNNs), a state-of-the-art representation for still image recognition, to action recognition in videos. Specifically, embodiments of the invention endow CNN with an "attention" mechanism by employing spatial transformer modules (STs) before the CNN. The artificial neural network architecture according to embodiments of the present invention combines the power of STs and CNNs to perform the task of recognizing human actions in videos such as surveillance videos.

A convolutional neural network (CNN) is a type of feed-forward artificial neural network; it is useful particularly in image recognition. Inspired by the structure of the animal visual cortex, a characteristic of CNNs is that each neuron in a convolutional layer is only connected to a relatively small number of neurons of the previous layer. A CNN typically includes one or more convolutional layers, pooling layers, ReLU (Rectified Linear Unit) layers, fully connected layers, and loss layers. In a convolutional layer, the core building block of CNNs, each neuron computes a dot product of a 3D filter (also referred to as kernel) with a small region of neurons of the previous layer (referred to as the receptive field); in other words, the filter is convolved across the previous layer to generate an activation map. This contributes to the translational invariance of CNNs. In addition to a height and a width, each convolutional layer has a depth, corresponding to the number of filters in the layer, each filter producing an activation map (referred to as a slice of the convolutional layer). A pooling layer performs pooling, a form of down-sampling, by pooling a group of neurons of the previous layer into one neuron of the pooling layer. A widely used pooling method is max pooling, i.e. taking the maximum value of each input group of neurons as the pooled value; another pooling method is average pooling, i.e. taking the average of each input group of neurons as the pooled value. The general characteristics, architecture, configuration, training methods, etc. of CNNs are well described in the literature. Various specific CNNs models have been described as well.

A spatial transformer is a learnable neural network module which can give spatial invariance to the input data when inserted into existing convolutional neural network architectures, without the need of any additional supervision. As an attention mechanism, a trained spatial transformer can automatically locate and transformed a salient region of the image into a "canonical" form (e.g. a typical form or orientation) that is best for the subsequent classification task. The transformation parameter output by the spatial transformer is also useful for localization. A spatial transformer is described in detail in Jaderberg et al. 2016 which will be referred to later in this disclosure.

In a network architecture according to embodiments of the present invention, a video snippet goes through a number of spatial transformers in parallel to focus on the key subject in the frame at each of a sequence of time points. The focused parts picked by the spatial transformers are fed into CNNs, which act as feature extractors. The high-level visual features of the focused parts extracted by the CNNs are then combined with transformation parameters output by the spatial transformers into a final feature vector for action classification.

FIG. 1 schematically illustrates the architecture of an artificial neural network, referred to as ST-CNN for convenience, according to an embodiment of the present invention.

The input data to the ST-CNN network is a 3-dimensional (3D) tensor of size H×W×D data points. In one embodiment, the 3D input tensor is a video snippet consisting of a number (D, which is a natural number greater than 1) of time-lapse frames of video image (also referred to as D channels), each frame (channel) having a size of H×W pixels. In other words, the video snippet may be seen as a multi-channel image (the 3D tensor) having height H, width W, and depth D, where D is in the time direction. In practice, the video snippet may be formed of frames taken sequentially from a short video clip (e.g. five frames taken from a five-second video clip).

As shown in FIG. 1, the ST-CNN network includes a bank of D parallel spatial transformer module ST-1, ST-2, . . . ST-D, two CNN networks (CNN-Sub and CNN-Env), a fully connected (FC) layer, and a final Softmax layer.

Each spatial transformer (ST) is a neural network module similar to that described in Jaderberg et al. 2016 and will be described in more detail later. Each of the D ST modules (e.g. ST-i, i=1, . . . D) processes a corresponding one of the D channels of the input data (e.g. channel-i), and has learnt to focus on two features of the frame to generate two attention windows and corresponding transformation parameters. In a practical example where the video snippet involves a human subject engaged in an action, the first attention window will learn to focus on the main subject and the second on the subject's immediate environments (e.g., wheelchair, bed, floor, care-giver, etc. in a healthcare or elder-care situation). The first and second attention windows will crop and transform the salient regions of that input frame (channel-i) into first and second patches (of sizes H'×W' and H"×W" pixels, respectively, which may be equal or different) which are "good forms" that facilitate subsequent feature extraction by the CNNs. Once the two attention windows are generated from channel-i, they are applied to all D channels of the input data to crop the same regions of the D frames and transform them into two patch sequences, referred to as "subject patch sequence-i" and "environment patch sequence-i", respectively. The two patch sequence are 3D tensors of size H'×W'×D and H"×W"×D, respectively.

Figure 2:
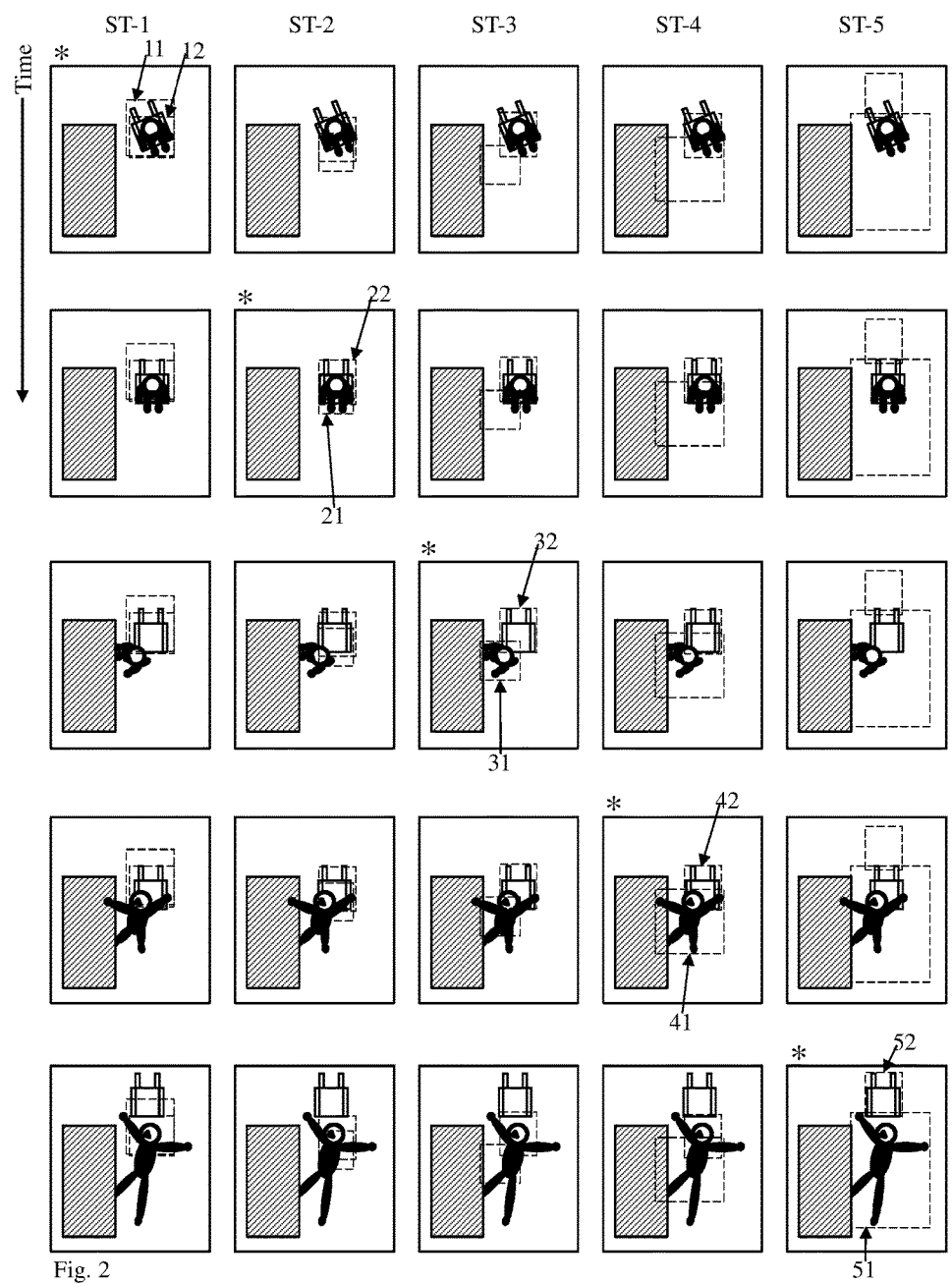
FIG. 2 schematically illustrates an exemplary five-frame video snippet according to an embodiment of the present invention, showing five subject and environment patch sequences each generated by an ST module based on one of the five frames.

FIG. 2 schematically illustrates an exemplary five-frame video snippet involving a human subject attempting to get up from a wheelchair next to a bed and falling on the floor, showing five subject and environment patch sequences each generated by an ST module based on one of the five frames. Each column in FIG. 2 shows the five video frames in a time sequence (top to bottom); the i-th column shows, within each video frame, the two attention windows (in dashed lines) generated by the spatial transformer module ST-i based on the i-th frame. In each column, the frame denoted by an asterisk is the i-th frame used by the corresponding ST module to generate the attention windows; it can be seen that the attention windows crop salient parts of that frame. Note that the dashed line boxes shown in FIG. 2 represent the attention windows relative to the input frame, not the patches that the windows are transformed into. Also note that in the illustrated example, the attention windows are shown as rectangular boxes; this is for simplicity of illustration only, in practice they may have other shapes depending on the transformation.

Note also that although in this example the second attention window (env-win) from all ST modules are focused on the same environmental feature (the wheelchair), in practice, it is possible that the second attention window from different ST modules may focus on different environmental features.

Referring back to FIG. 1, the D subject patch sequences (each of size H'×W'×D) are concatenated to form first concatenated data and inputted into the first CNN network, CNN-Sub; the D environment patch sequences (each of size H"×W"×D) are concatenated to form second concatenated data and inputted into the second CNN network, CNN-Env. The two CNNs, which are independent of each other, extract visual features such as appearance, texture, shape, etc. for the subject and its surroundings across time. Each of CNN-Sub and CNN-Env may be implemented by a suitable CNN without fully connected layers or final classification or regression layers, such as AlexNet developed by Alex Krizhevsky et al., which is a relatively simple CNN with five convolutional layers, three fully connected layers and a softmax layer. More sophisticated and powerful CNNs may be used if a sufficiently large amount of training data is available.

The output of the two CNNs and the transformation parameters for the first attention windows outputted by the D spatial transformers ST-1, . . . ST-D, denoted $\theta_1, \ldots \theta_D$, are combined (concatenated) into a final feature vector. The concatenation may be done in any suitable way, so long as it conforms to the input requirement of the FC layer. This final feature vector, which contains global spatio-temporal information, is inputted to a classification network, formed by the fully connected layer (FC) and the softmax layer, to output a predicted action class for the input video snippet. The fully connected layer fuses the visual information with the global spatio-temporal information of the input video snippet, and the softmax layer is the final action classification layer that maps the fused information to a class score, which is the output of the ST-CNN. The FC layer and the softmax layer may be implemented by well known technology and not explained in detail here. In some embodiments, multiple (e.g. two) FC layers may be used.

In addition to the predicted action class, the output of the final classification network may optionally include a volumetric window showing the location and time of the predicted action.

Note here that while each ST module calculates both the transformation parameters for the first (subject) attention window and the second (environment) attention window, only the transformation parameters for the first attention window is used for the final feature vector. This is because the goal is to identify the action of the subject, so only the transformation of the subject is of interest; while the information from the second (environment) attention window is helpful for inferring the action of the subject, its transformation is not of interest.

The structure of the spatial transformer module ST-i (i=1, . . . D) is described in more detail with reference to FIG. 3. This spatial transformer is similar to the one shown in FIG. 2 of Jaderberg et al. 2016 but predict two sets of transformation parameters, as described in Sections 3.4 and 4.3 and FIG. 6 of that paper.

Figure 3:
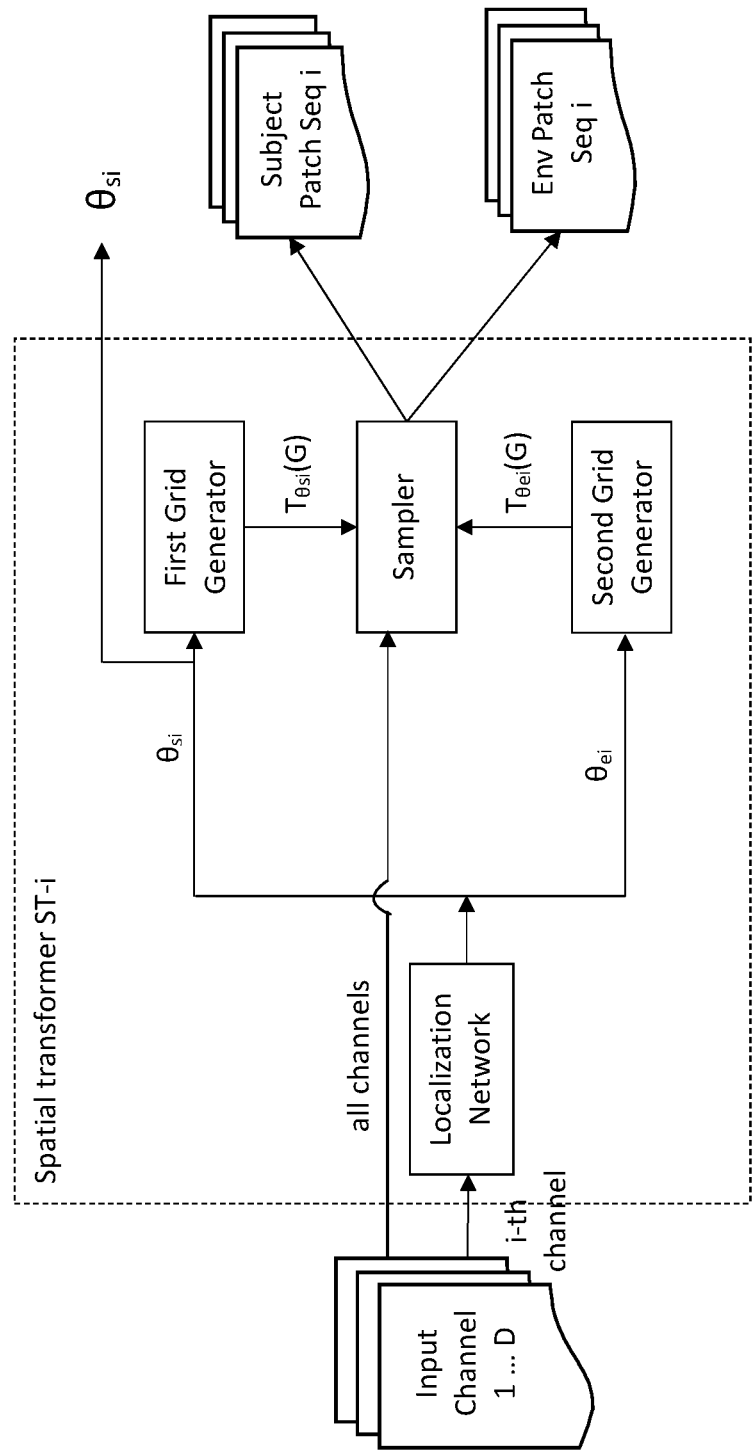
FIG. 3 schematically illustrates the structure of a spatial transformer module according to an embodiment of the present invention.

As shown in FIG. 3, the spatial transformer module ST-i includes a single localization network, a first and a second grid generator, and a sampler. The localization network takes the i-th channel of the input 3D tensor as its input and generates two transformation parameters $\theta_{si}$ and $\theta_{ei}$. The localization network may be any suitable network, such as fully connected networks or convolutional networks, and contains a final regression layer to produce the transformation parameters.

The first grid generator generates a first sampling grid $T_{\theta_{si}}(Gs)$ by transforming a regular grid Gs (of size H'×W') of the output patch according to the transformation parameters into the first sampling grid over the input frame. Thus, the first sampling grid, which corresponds to the attention window described earlier, is a set of points where the input frame should be sampled to produce the transformed patch as output. The sampler applies the first sampling grid to each of the D channels of the input 3D tensor individually, to sample each input channel at the sampling grid points to produce a corresponding output patch. Sampling is done by applying a sampling kernel centered at each grid point location of the input data (the input data should be differentiable). The D output patches are combined to form the i-th subject patch sequence.

Similarly, the second grid generator generates the second sampling grid $T_{\theta_{ei}}(Ge)$ (the regular grid Ge being of size H"×W"), which is used by the sampler to sample the D input channels to produce the i-th environment patch sequence.

Note that while the sampler is shown as one component in FIG. 3, it may in fact include two separate samplers to sample the input using first and second sampling grids in parallel.

In one embodiment of the present invention, each of the two transformations is one that allows cropping, translation, rotation, scaling, skew, projective transformation, and elastic warping.

Details of the localization net, the grid generator and the sampler are described in Jaderberg et al. 2016, Section 3, which is incorporated herein by reference as necessary to provide enablement.

One difference between the spatial transformers used in embodiments of the present invention and the spatial transformer described in Section 3 of Jaderberg et al. 2016 is that each spatial transformer ST-i in the present embodiment uses only one of the D channels of the input data to generate the sampling grid but applies the same sampling grid to all channels of the input data, to generate a patch sequence from the sequence of video frames. In Jaderberg et al. 2016, for multi-channel input data, one transformation (sampling grid) is calculated using all data channels and is applied to each data channel. In embodiments of the present invention, by using a series of spatial transformers ST-1, . . . ST-D each generating a transformation from only one input channel (frame), a series of patch sequences and corresponding transformation parameters are generated, which capture temporal information useful for action recognition.

From a computer vision perspective, three types of information are needed for recognizing actions by a subject from video images: Appearance information, which includes the texture and shape information of the subject as well as its surroundings; spatial information, which includes the spatial location of the subject within the environment; and temporal information, which includes the history of the appearance information and the spatial information. In the ST-CNN network architecture according to embodiments of the present invention, shown in FIG. 1, the appearance information is captured by the CNNs, the spatial information is captured by the STs located before the CNNs, and the temporal information is captured by the concatenation of the multiple patch sequences for input to the CNNs and the concatenation of the output of the CNNs and the transformation parameters into the final feature vector for input to the classification network.

The ST-CNN network shown in FIG. 1 may be trained by back-propagation in an end-to-end manner. In the training data, each video snippet is manually labeled with an "action class" of the action that the subject performs. In one embodiment, the manual labels include about ten action classes in total. There are no other labels in the training data; e.g., there are no labels for the subject itself, or for any of the environmental features.

In an alternative embodiment, to recognize actions of two or more subjects, the spatial transformer module (FIG. 3) may be expanded by providing adding sets of localization network, grid generator and sampler for the additional subject(s) and optionally for additional environment features. Correspondingly, additional CNNs are provided to receive and process the additional patch sequences generated by the spatial transformers; the outputs of all CNNs and the transformation parameters for the multiple subject windows outputted by all spatial transformers are concatenated to form the final feature vector for the classification network.

The ST-CNN neural network architecture described above has many advantages for action recognition, including accurate and fast recognition by focusing on relevant part in the video, spatial invariance in action recognition (location, viewing angle, etc.), automatic localization without supervision, etc. The ST can serve as a spatial self-attention module that picks the most relevant "patches" for the task, effectively reducing the computational cost.

The ST-CNN neural network may be implemented as software, firmware, hardware, or a combination of them, such as a computer system including processors and memories storing computer executable programs, special purpose logic circuitry such as FPGA (field programmable gate array) and ASIC (application specific integrated circuit), etc. Each of the components of the system may be implemented as a computer program module executed by processors. In addition, because of the parallel design of the STs and CNNs, the system can be implemented to utilize parallelization technology such as a cluster of GPUs. The system that the neural network is implemented on is generally referred to as a data processing system.

It will be apparent to those skilled in the art that various modification and variations can be made in the artificial neural network architecture and related method of the present invention without departing from the spirit or scope of the invention. Thus, it is intended that the present invention cover modifications and variations that come within the scope of the appended claims and their equivalents.

What is claimed is:

1. An artificial neural network implemented on a data processing system for analyzing input data to recognize an action therein, the input data being a 3-dimensional input tensor having D channels, D being a natural number greater than 1, the artificial neural network comprising:
   D spatial transformer neural network modules,
   wherein each spatial transformer module is configured to receive the input tensor, generate a first and a second spatial transformation using only one of the D channels, generate a first and a second attention window respectively corresponding to the first and the second spatial transformation, transform a first and a second region of each of the D channels of the input tensor corresponding to the first and the second attention window to a first and a second output patch for that channel, the first and the second output patches for all D channels respectively forming a first and a second patch sequence, wherein each spatial transformer module is further configured to output a set of first transformation parameters of the first spatial transformation, wherein different ones of the D spatial transformer modules are configured to use different ones of the D channels of the input tensor to generate their first and second spatial transformations;

a first and a second convolutional neural network (CNN), the first CNN being configured to receive as input a concatenation of the D first patch sequences generated by the D spatial transformer modules and to generate a first CNN output, the second CNN being configured to receive as input a concatenation of the D second patch sequences generated by the D spatial transformer modules and to generate a second CNN output; and a classification neural network, configured to receive as input a concatenation of the first CNN output, the second CNN output, and the D sets of first transformation parameters outputted by the D spatial transformer modules, and to generate a predicted action class.

2. The artificial neural network of claim 1, wherein the input data is a video snippet including a time sequence of D frames, each frame being a channel of the input tensor.

3. The artificial neural network of claim 1, wherein each spatial transformer neural network module includes:

a localization neural network, configured to receive the one of the D channels of the input tensor and to generate the set of first transformation parameters and a set of second transformation parameters;

a first grid generator, configured to generate a first sampling grid by transforming a first regular grid according to the set of first transformation parameters into the first sampling grid over the one channel of the input tensor;

a second grid generator, configured to generate a second sampling grid by transforming a second regular grid according to the set of second transformation parameters into the second sampling grid over the one channel of the input tensor; and a sampler, configured to apply the first sampling grid to sample each one of the D channels of the input tensor to generate the first patch sequence, and to apply the second sampling grid to sample each one of the D channels of the input tensor to generate the second patch sequence.

4. The artificial neural network of claim 1, wherein the classification neural network includes a fully connected layer and a softmax layer.

5. The artificial neural network of claim 1, wherein each of the first and second spatial transformations includes one or more of cropping, translation, rotation, scaling, skew, projective transformation, and elastic warping.

6. A method performed by an artificial neural network implemented on a data processing system, to analyze input data to recognize an action therein, the input data being a 3-dimensional input tensor having D channels, D being a natural number greater than 1, the artificial neural network comprising D spatial transformer neural network modules, a first and a second convolutional neural network (CNN), and a classification neural network, the method comprising:

by each of the D spatial transformer neural network modules:

receiving the input tensor;

using only one of the D channels of the input tensor, generating a set of first transformation parameters and a set of second transformation parameters;

generating a first sampling grid by transforming a first regular grid according to the set of first transformation parameters into the first sampling grid over the one channel of the input tensor;

generating a second sampling grid by transforming a second regular grid according to the set of second transformation parameters into the second sampling grid over the one channel of the input tensor;

applying the first sampling grid to sample each one of the D channels of the input tensor to generate a first patch sequence; and applying the second sampling grid to sample each one of the D channels of the input tensor to generate a second patch sequence;

wherein different ones of the D spatial transformer modules use different ones of the D channels of the input tensor to generate their first and second spatial transformations;

concatenating the D first patch sequences generated by the D spatial transformer modules into first concatenated data;

by the first CNN, receiving the first concatenated data as input and generating a first CNN output;

concatenating the D second patch sequences generated by the D spatial transformer modules into second concatenated data;

by the second CNN, receiving the second concatenated data as input and generating a second CNN output;

concatenating the first CNN output, the second CNN output, and the D sets of first transformation parameters generated by the D spatial transformer modules into a final feature vector; and by the classification neural network, receiving the final feature vector as input and generating a predicted action class.

7. The method of claim 6, wherein the input data is a video snippet including a time sequence of D frames, each frame being a channel of the input tensor.

8. The method of claim 6, wherein each of the sets of first and second transformation parameters describes a transformation that includes one or more of cropping, translation, rotation, scaling, skew, projective transformation, and elastic warping.

* * * * *